April 25, 1961        A. C. DAVIDSON        2,981,536

RAILWAY TRUCK BOLSTER SPRING SNUBBER

Filed Dec. 12, 1958        2 Sheets-Sheet 1

Inventor
Arthur C. Davidson
By Rodney Bedell
atty.

April 25, 1961   A. C. DAVIDSON   2,981,536
RAILWAY TRUCK BOLSTER SPRING SNUBBER
Filed Dec. 12, 1958   2 Sheets-Sheet 2

Inventor
Arthur C. Davidson
By Rodney Bedell
atty.

United States Patent Office 2,981,536
Patented Apr. 25, 1961

2,981,536

RAILWAY TRUCK BOLSTER SPRING SNUBBER

Arthur C. Davidson, Chicago, Ill., assignor to Chicago Railway Equipment Company, Chicago, Ill., a corporation of Illinois Filed Dec. 12, 1958, Ser. No. 779,927

5 Claims. (Cl. 267—9)

This invention relates to railway truck spring brakes or snubbers, and more particularly to a snubber for the bolster springs of a railway freight car truck adapted to prevent undesirable rebound action of these springs such as would give the car rough riding characteristics tending to damage lading and to derail the truck.

The invention is an improvement upon the construction shown in United States Patent 2,404,475 issued July 23, 1946, which shows a spring carrier supported on a spring plank which extends between the side frames of the railway truck, bolster springs on the carrier, and a spring cap on the springs supporting the end of the bolster. Two friction plates extend up from the carrier on opposite sides of the wedge extending down from the cap. A bolt extends horizontally through the plates and wedge and carries springs for biasing the plates into frictional engagement with the wedge. The upper end of the wedge has bifurcations seated in arcuate lugs on the cap. The friction plates have inturned flanges at their lower ends seated in recesses in a horizontal bar received in a slot in the carrier and bearing on the spring plank, end portions of the bar being confined between the spring plank and upwardly arched recesses in the carrier.

There is such clearance between the ends of the bolster and the columns of the truck side frames between which the bolster ends extend that the bolster may shift endwise (laterally) and tilt (lengthwise) relative to the side frames. In the operation of a freight car, such shifting and tilting occur frequently. To avoid excessive stressing of the parts of the snubbing device in the patent mentioned, during such shifting of the bolster, it is necessary that the parts have a loose fit to allow for their relative movements without excessive stress. For example, the inturned flanges at the lower ends of the friction plates have a loose fit in the recesses in the bar, and the bar ends have a loose fit between the spring plank and the carrier recesses. Otherwise, the inturned end flanges of the friction plates are subjected to localized stresses such as tend to make them break off. With such a loose fit, however, the wedge and plates shift transversely of the bar as well as pivot on it, resulting in nonuniform action of the friction plates, and canting of the bolt relative to the friction plates, with resultant uneven action of the bolt springs on the friction plates.

Accordingly, it is an object of this invention to provide an improved snubber construction in which, while there is necessary clearance between parts for snubbing action, the plates and wedge swing more accurately about a fixed axis in the bar and the parts are not subjected to localized stresses upon shifting of the bolster, and the spring pressures are varied solely by the lengthwise movement of the wedge between the plates and avoid canting of the bolt relative to the friction plates.

One of the features of the improved construction whereby these results are obtained is the journaling of the bar for rotation on an axis generally parallel to the pivotal axis of the wedge, this axis being located inward of the adjacent spring cap and the bar is provided with recesses in which the inturned flanges of the friction plates have a sliding fit. Another feature of the improved construction is the pivoting of the wedge on a shaft journaled in bearings on the adjacent spring seat, allowing for free swinging of the wedge throughout a relatively wide range of swinging movement and thus allowing for substantial shifting of the bolster without binding of the wedge so as to avoid stressing the wedge.

In the accompanying drawings illustrating a selected embodiment of the invention:

Figure 1:
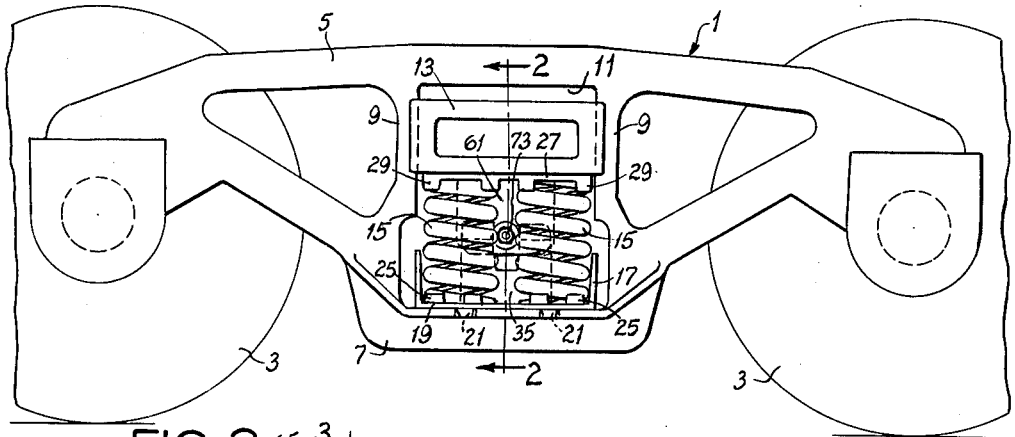
Figure 1 is a side elevation of a four-wheel railway freight car truck in which the invention is incorporated.
Figure 2:
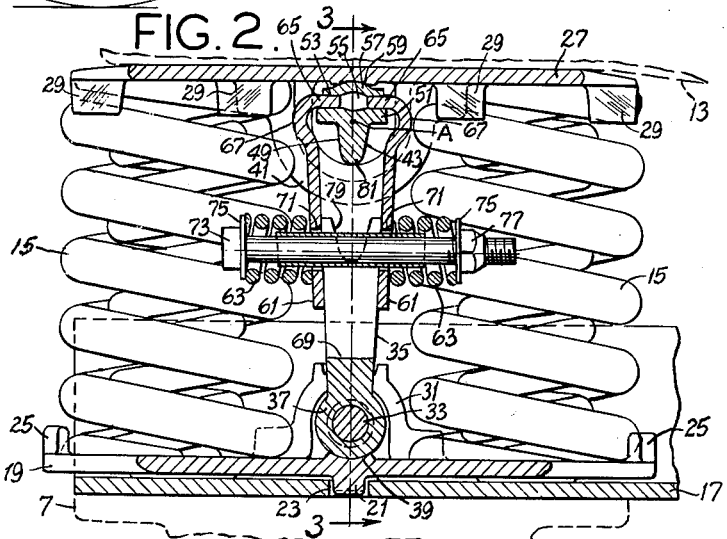
Figure 2 is an enlarged vertical section transverse to the truck on line 2—2 of Figure 1.

The truck side frame is integral with journal boxes 1 mounted on the axles of wheels 3, and includes the usual upper chord or compression member 5 and lower chord or tension member 7. Extending between the upper and lower chords are spaced struts or columns 9 defining a window 11 for bolster 13 and bolster-supporting springs 15. Preferably, a beam or spring plank 17 (which may be of channel shape in cross section as shown) extends between the two side frames of the truck, bearing on the portions of lower chords 7 of the frames between struts 9. A spring carrier 19 is mounted on each end of the plank and is positioned by lugs 21 extending down into holes 23 in plank 17. It also has upstanding lugs 25 for positioning springs 15. The end of bolster 13 bears on a spring cap 27, which in turn bears on the upper ends of the springs. Cap 27 has downwardly extending spring-centering lugs 29.

Spring carrier 19 has upwardly extending bearings 31 at its ends supporting a shaft 33 which extends transversely of the bolster intermediate the inner and outer springs 15. Clips 34 oppose the ends of the shaft and retain the shaft in the bearings. The shaft pivotally mounts the upright wedge 35 having a sleeve lower end 37 surrounding the shaft and received in an arcuate recess 39 in spring carrier 19. Wedge 35 has downwardly converging side faces.

Spring cap 37 has downwardly extending bearings 41 at its ends journaling a bar 43 parallel to shaft 33. Bar 43 has end portions 45 of circular cross section adjacent its ends journaled in bearings 41, portions 47 of U shape in cross section extending out from circular portions 45, and portion 49 of T shape in cross section extending between the circular portions 45. The head 51 of the T shaped portion 49 of bar 43 has a horizontal slot 53. This slot is located above the bar axis A. Preferably it has a widened central portion 55. The top 57 of head 51 is curved on an arc centered in the axis of the bar circular portions 45 and spring cap 27 has a concave seat 59 bearing on the head.

Pivot bar 43 supports a pair of upright friction plates 61 each having a normally horizontal upper terminal flange 65 slidable in slot 53 in pivot bar 43 and spaced from spring cap 27. An outwardly curved portion 67 connects plate 61 and flange 65. Plates 61 extend downwardly from pivot bar 43 on opposite sides of wedge member 35 and are biased into frictional engagement with the side faces of wedge 35 by compression springs 63 carried by a bolt 73 extending through holes 71 in plates 61 and an upwardly open slot 69 in wedge member 35 and having spring seating washers 75 at its head and its nut 77. The upper edge of wedge member 35 has a lengthwise groove 79 adapted to receive the stem 81 of T shaped portion 49 of pivot bar 43 upon extreme downward movement of the later with bolster 13 and spring cap 27.

With the above described construction, downward movement of bolster 13, compressing springs 15 causes friction plates 61 to be driven downwardly. On the rebound or expansion of springs 15, plates 61 are pulled upwardly and as they are driven upwardly they are spread apart against the bias of springs 63. The friction of plates 61 on wedge 35 results in a snubbing action, substantially greater on the rebound than on the downward movement of the plates. Consequently the bolster springs 15 are effectively snubbed on rebound without substantially interfering with the initial compression action which should be soft to maintain easy riding qualities of the truck to reduce lading and equipment damage.

Figure 5:
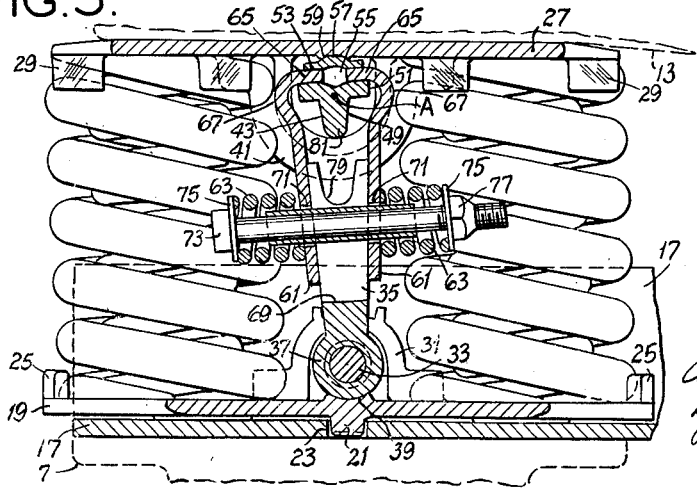
Figure 5 is a view similar to Figure 2, illustrating a different position of the parts.
Figure 3:
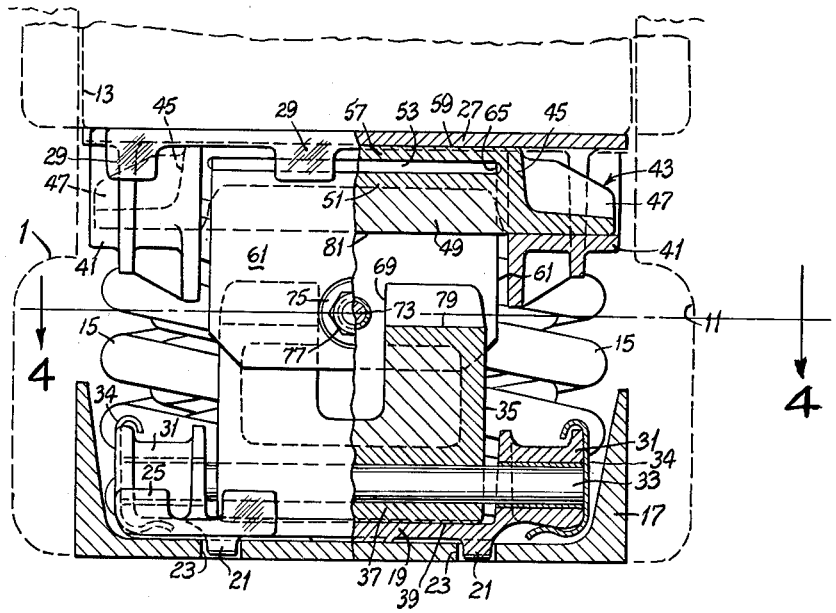
Figure 3 is in part an enlarged fragment of Figure 1, with parts broken away, and in part a section on line 3—3 of Figure 2.
Figure 4:
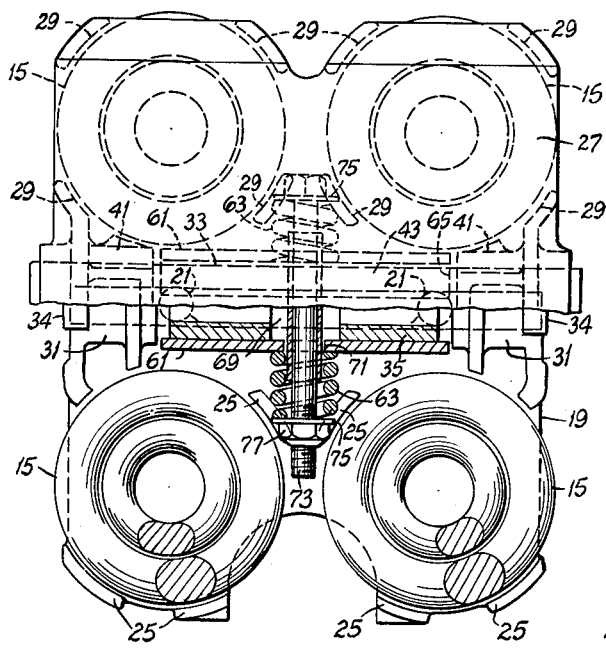
Figure 4 is in part a plan of Figure 3 and in part a section on line 4—4 of Figure 3.

Upon lateral shifting of bolster 13 with resultant lateral shifting of cap 27 relative to carrier seat 19 (Figure 5), friction plates 61 and wedge 35 tilt freely relative to the cap and the carrier, without shifting of plates 61 relative to one another or to bar 43. This is because bar 43 and shaft 33 each rotates about its axis and their axes are maintained in the central plane of the wedge during shifting of cap 27. As a result, there are no bending stresses in the flanges at the upper ends of plates 61 or in the curved portions 67 connecting the flanges to the upright plates. This avoids excessive stresses at the bends as was present in earlier devices. Bolt 73 is always maintained at a right angle to the axis of the wedge and is held against canting relative to plates 61, thereby insuring that springs 63 do not become canted relative to the plates. The load on cap 27 is transmitted directly to pivot bar 43 by the bearing of the concave seat 59 on the top 57 of the head of the pivot bar, and the load on wedge 35 is transmitted directly to seat 19 by reason of the bearing of the curved bottom edge of tubular portion 37 of the wedge on concave seat 39 formed on the spring seat 19. Accordingly, bearings 41 for pivot bar 43 and bearings 31 for shaft 33 are relieved of stresses due to load.

The details of the structure may be varied substantially without departing from the spirit of the invention and the exclusive use of those modifications coming within the scope of the claims is contemplated.

I claim:

1. In a device for snubbing railway truck bolster springs, a bolster spring carrier member, a bolster spring cap member, an elongated horizontal shaft mounted in one of said members to rotate about a fixed axis, an elongated horizontal part journaled in the other of said members to rotate about a fixed axis and having transverse horizontal slots, an upright wedge fixedly mounted at one end on said shaft and pivotable therewith as a unit about the axis thereof, upright friction plates at the sides of said wedge with end flanges slidable in said slots whereby said plates may move toward and from each other, said plates being pivotable as a unit with the slotted part about the axis thereof, and spring means thrusting said plates against said wedge.

2. A device for snubbing railway truck bolster springs, a bolster spring carrier member, a bolster spring cap member, a pair of upright plates extending abreast of each other between said members, a single upright plate received between the pair of plates, spring means thrusting the pair of plates toward each other to frictionally engage the opposing surfaces of the other plate, a pivot element providing support for the adjacent ends of said first-mentioned plates out of contact with the adjacent member and having cylindrical ends journaled on said spring cap, and a pivot element remote from said first-mentioned element and having cylindrical ends journaled in said carrier and providing a support for the corresponding end of said intermediate plate out of contact with the adjacent member.

3. In a spring device comprising vertically spaced first and second spring seats and spring means between the seats, snubbing means comprising a wedge pivoted along one end thereof on the first seat and extending toward the second seat, the sides of the wedge diverging in the direction toward the second seat, a bar spaced from the other end of the wedge and journaled on the second seat for rotation thereon about an axis generally parallel to the pivotal axis of the wedge, said bar being longitudinally slotted to provide recesses located closely adjacent the axis of said pivot bar extending inward of the bar from opposite sides thereof, a pair of upright friction plates provided with horizontal end flanges inserted in respective recesses and extending from opposite sides of said bar and pivoting therewith, and spring means biasing said plates into frictional engagement with the sides of said wedge.

4. In a spring device comprising first and second spring seats and spring means between the seats, snubbing means comprising a wedge having a cylindrical bearing along one edge thereof on the first seat and extending toward the second seat, the sides of the wedge diverging in the direction toward the second seat, bearings extending inward from the second seat, a bar having portions adjacent its ends journaled in said bearings, the axis of said bearings and said bar being generally parallel to the pivotal axis of the wedge and located inward of the second seat, said bar having a portion of T shape in cross section extending between said bearings, the head of the T shape section being slotted transversely of the bar to provide recesses extending inward from opposite side edges thereof, the stem of the T extending toward the first seat, a pair of friction plates each provided at one end with a flange having a sliding fit in a respective recess and extending from opposite sides of said bar on opposite sides of said wedge, and spring means biasing said plates into frictional engagement with the sides of said wedge.

5. In a device for snubbing railway truck bolster springs, a bolster spring carrier member and a bolster spring cap member spaced apart vertically to receive bolster springs between them, a horizontally elongated part journaled in a fixed circular bearing on one of said members to rotate about a fixed axis, a horizontally elongated part journaled in a fixed circular bearing on the other of said members to rotate about a fixed axis, an upright plate supported at one end on one of said parts and pivotable therewith about the axis thereof with its swinging end spaced from the other part, upright friction plates at opposite sides of and contacting said first mentioned plate with ends adjacent to the other of said parts slidable thereon to and from each other and pivotable therewith about the axis thereof, and spring means thrusting said latter mentioned plates toward each other and against the first mentioned plate.

References Cited in the file of this patent
UNITED STATES PATENTS

| | | |
|---|---|---|
| 1,353,514 | Boswell | Sept. 21, 1920 |
| 2,389,840 | Bruce | Nov. 27, 1945 |
| 2,404,475 | Davidson | July 23, 1946 |